Patented Apr. 19, 1949

2,467,498

UNITED STATES PATENT OFFICE 2,467,498

PROCESS OF MAKING SYNTHETIC RESIN ADHESIVE BASE FROM CRESYLIC ACID AND FURFURAL

Donald V. Redfern, Seattle, Wash., assignor, by mesne assignments, to American-Marietta Company, Chicago, Ill., a corporation of Illinois No Drawing. Application September 8, 1942,
Serial No. 457,650

1 Claim. (Cl. 260—7)

This invention relates to the manufacture of a synthetic resinous product suitable for use as a glue base. The resin comprises the reaction product of a phenol and/or its homologs with an aldehyde and a modifying material in an alkaline medium, the whole being absorbed by another material, which may be termed an absorbent. The product when cooled is a hard, comminutable substance.

The phenols and aldehydes selected are of such a nature as to form a resin in the absence of water, except for the limited quantity of water which serves as the solvent for the catalyst, and the water of condensation formed in the reaction. The material thus formed is hydrophobic in character, the water being removed during the reaction period. This procedure results in a resin that is dry when brought to the completion stage since water of condensation is continuously removed, as it is formed, from the reaction vessel.

Heretofore most of the resinous plywood glue adhesive bases have been formed in the presence of a considerable quantity of water, this water having to be removed later through some sort of drying process, or the resin applied in a liquid form. These prior liquid resins, after being made, are hard to transport, have a short life due to the continued condensation, and necessitate the shipping of a large quantity of water at a relatively high cost.

My invention, on the other hand, relates to the formation of a so-called "dry" resin, which does not have to undergo any drying process in its manufacture, and which may be readily ground to a fine powder at room temperatures, and has much broader limits on its life because it is in a dry form and may be stored for an indefinite length of time.

The modifying material is initially included with the ingredients to be reacted in order to produce a resin which is potentially thermosetting and alkaline dispersible. The absorbing material is added later to the hot resin at the end of the initial reaction period in order to produce a resin comminutable at room temperatures. From the mixer in which the absorbent material is added the resin is allowed to flow into pans or some other similar receptacle to cool, or it may be cooled in any other suitable manner. The preferred resin is one made from a cresylic acid and furfural in a molar ratio of about two mols of cresylic acid to one mol of furfural together with a substantial amount of the modifying agent. Among the suitable modifying agents, the following may be mentioned: so-called insoluble blood, dried activated sludge, or sulfur. These materials are refluxed in order to form a resin which, before or after the addition of the "absorbent" material, will form a product which hardens at about 20° C. in the presence of an alkaline catalyst such as caustic soda in the amount of about ten per cent (10%) figured on the basis of the furfural added. Sufficient absorbent material, such as activated sludge and/or insoluble blood, are added to make the resin easily comminutable. This resin is made in a kettle with a reflux condenser so arranged that the water dispelled can be run off, whereas any of the cresylic acid or furfural that comes off can be returned to the reaction chamber. The resin so formed is suitable as a base for plywood glues, which are waterproof and will pass the standard tests for exterior moisture-resistance requirements as set forth in the National Bureau of Standards Commercial Standard Bulletin Numbered CS45-38 (a U. S. Department of Commerce publication).

I do not wish to confine myself to any specific grade of cresylic acid in the manufacture of the above-described resin, although it has been found that any grade or combination thereof imparts specifically different characteristics to the finished product. Any alkaline catalyst may be used, for example sodium and potassium hydroxide, or any of the so-called alkali metal salts, singly or in combination. However, I prefer to use sodium hydroxide.

During the present emergency it is imperative that all so-called "defense" materials be saved or made to serve their maximum purpose. The resin adhesive base described herein can be extended by materials heretofore thought unsuitable for plywood adhesive formulation due to the treatment undergone in their formation. Among these may be mentioned insoluble blood, which is known commercially as fertilizer blood and which has been heated at high temperature in its drying process, and activated sludge, which is dried activated sewage sludge that has undergone drastic treatment to dry it and completely destroy all bacteria. The preferred dried activated sludge is known commercially as "Milorganite" and is made by the Milwaukee Sewage Commission, of Milwaukee, Wisconsin. Both of these materials are very cheap in comparison to the expensive resin-forming phenol and aldehyde. Neither of these extenders, also referred to herein as modifying agents and absorbent materials, are at present regarded as "defense" materials; consequently with a given amount of the "defense" resin-forming materials it is possible by my invention to produce a much greater amount of adhesive base, by the addition of said "extenders," than is achieved with the resin adhesive bases now used by the plywood industry for a similar purpose. Aside from the matter of "defense" there is here a pronounced economic saving in that a relatively small amount of the more expensive phenol and aldehyde is made to do the work of a relatively large amount of said materials which are being used at the present time.

Resins heretofore used in the manufacture of plywood adhesives have required special equipment or special attention when mixed and applied to the panels. The present resin adhesive base is used in a manner wholly familiar to, and commonly practiced by, the plywood industry, and does not necessitate the use of unfamiliar techniques or added equipment for its application.

The modifying materials and absorbing materials which have been found suitable for my process are the following:

1. Sulfur
2. Proteinous materials, such as:
    Dried activated sludge
    Insoluble blood
    Soluble blood
    Casein
    Oleaginous seed meals, as such, heat-treated, or aldehyde-treated; examples of which are:
        Soya
        Peanut
        Cottonseed
        Flaxseed
3. Ligneous materials, such as:
    Lignin from sulfite waste liquor
    Meadol (an alkaline soluble lignin product made by the Mead Corporation)
4. Cellulosic materials, such as wood flour
5. Starch containing materials, such as:
    Manioc
    Wheat flour The above materials may be used singly or in combination as modifying materials or as absorbents. They may be referred to collectively as extenders, by which term either modifying agents or absorbents or both are intended to be included.

By "modifying agents" as used in the present description and claim, I refer to materials from the above list which, when added to the reacting ingredients before or during the reaction, serve to modify or change the characteristics of the initial resin. By "absorbing materials" I refer to any materials selected from the above list which, when added at the end of the reaction period, serve to change the final characteristics of the resin adhesive base. By the term "extenders" I intend to cover generically either "modifying agents" or "absorbing materials."

The following are illustrative examples of my process: I have found that the ingredients, temperatures, and proportions stated are well adapted for this purpose and give excellent results, but it is to be understood that they may be varied to some extent, partly depending on the type of cresylic acid used and the modifying agent employed. The type of modifying and/or absorbing materials used also plays a part in determination of the final quality of the product.

*Example No. 1*

| | Parts by weight |
|---|---|
| Cresylic acid | 216 |
| Sulfur | 32 |
| Furfural | 96 |
| Caustic soda dissolved in | 10 |
| Water | 20 |

The above named materials are put in a reaction kettle fitted with a reflux condenser so that the water formed during the reaction period may be eliminated and any of the furfural or cresylic acid that may be carried over through the condenser and formed in a layer below the water to be eliminated, may be returned to the reaction kettle. The above named materials are heated to melt the sulfur herein used as the modifying agent, the caustic soda solution is then added and the mixture boiled for twenty-five (25) minutes. One hundred (100) parts of insoluble blood (absorbing material) are then added and mixed in thoroughly and the resultant resin is poured on to trays to cool. After cooling the resin is ground to pass at least a one hundred-mesh (100) screen. This base is now suitable for admixture, in varying proportions dependent upon the quality of adhesive desired, with alkaline-dispersible material to form a new and superior type of plywood adhesive, as set forth in my application Serial No. 467,909, filed December 4, 1942.

*Example No. 2*

This is the same as Example No. 1 except that one hundred (100) parts of activated sludge is used to absorb the resin in place of the insoluble blood.

The proportions of resin-forming material used and the proportions and kind of extenders determine the kind of resin adhesive base formed. This base may be used to form adhesives which in turn are used to glue plywood panels which range in moisture resistance requirements from the highly water resistant exterior type down to the moderately water resistant interior type as determined in tests set forth by the National Bureau of Standards (see above bulletin reference).

The final product of the present application may be termed a "resin base" and may be used as one of the ingredients in the resin base adhesive as set forth in my application Serial No. 467,909, filed Dec. 4, 1942, entitled Synthetic resin base adhesive and method of making same, now Patent No. 2,430,736.

I claim:

A process which comprises reacting together cresylic acid, furfural and a modifying agent comprising sulphur at an elevated temperature in the presence of an alkaline catalyst to produce an alkaline dispersible potentially thermosetting resin, adding to the resin an absorbing material comprising insoluble blood, intimately mixing the mass and then cooling, thereby producing a hard, comminutable substance suitable for use as an adhesive.

DONALD V. REDFERN.

(References on following page)

REFERENCES CITED

The following references are of record in the file of this patent:

UNITED STATES PATENTS

| Number | Name | Date |
|---|---|---|
| 1,771,033 | Ellis | July 22, 1930 |
| 1,771,553 | Arnot | July 29, 1930 |
| 1,877,202 | Satow | Sept. 13, 1932 |
| 1,884,747 | Knapp | Oct. 25, 1932 |
| 1,988,475 | Berlin | Jan. 22, 1935 |
| 2,089,034 | Nevin | Aug. 3, 1937 |
| 2,141,313 | Osgood | Dec. 27, 1938 |
| 2,168,160 | Hochwalt | Aug. 1, 1939 |
| 2,175,480 | Nanfeldt | Oct. 10, 1939 |
| 2,193,941 | Seebach | Mar. 19, 1940 |
| 2,197,724 | Hovey | Apr. 16, 1940 |
| 2,292,624 | Fanthrop | Aug. 11, 1942 |

FOREIGN PATENTS

| Number | Country | Date |
|---|---|---|
| 280,144 | Germany | Dec. 21, 1912 |